(12) United States Patent
Scott-Collins et al.

(10) Patent No.: US 12,686,332 B2
(45) Date of Patent: Jul. 21, 2026

(54) MULTI-FUNCTIONAL RETAINER MEANS, REAR VIEW DEVICE ASSEMBLY METHOD AND VEHICLE

(71) Applicant: MOTHERSON INNOVATIONS COMPANY LIMITED, London (GB)

(72) Inventors: Callum Scott-Collins, Portchester (GB); Jakub Spychala, Portchester (GB); Kane Connor, Portchester (GB); Graham Rehill, Portchester (GB)

(73) Assignee: Motherson Innovations Company Limited, London (GB)

( * ) Notice: Subject to any disclaimer, the term of this patent is extended or adjusted under 35 U.S.C. 154(b) by 412 days.

(21) Appl. No.: 18/543,327

(22) Filed: Dec. 18, 2023

(65) Prior Publication Data

US 2024/0116443 A1 Apr. 11, 2024

Related U.S. Application Data

(63) Continuation of application No. 17/689,519, filed on Mar. 8, 2022, now Pat. No. 11,878,628.

(30) Foreign Application Priority Data

Mar. 25, 2021 (DE) ..................... 10 2021 107 589.0

(51) Int. Cl.
  *B60R 1/066* (2006.01)
  *B60R 1/072* (2006.01)
  (Continued)

(52) U.S. Cl.
  CPC ............. *B60R 1/066* (2013.01); *B60R 1/072* (2013.01); *B60R 1/12* (2013.01); *B60R 11/04* (2013.01);
  (Continued)

(58) Field of Classification Search
  CPC .............................. B60R 1/066; B60R 1/072; B60R 1/12; B60R 11/04; B60R 2001/1253;
  (Continued)

(56) References Cited

U.S. PATENT DOCUMENTS 5,889,624 A 3/1999 Dickenson
6,039,449 A 3/2000 Dolan et al.
(Continued)

FOREIGN PATENT DOCUMENTS

| CN | 212047174 | 12/2020 |
| WO | WO 2018/215599 | 11/2018 |
| WO | WO 2019/002627 | 1/2019 |

OTHER PUBLICATIONS

German Patent Office, Appl. DE 10 2021 107 589.0, Office Action, Nov. 25, 2021.

*Primary Examiner* — Collin X Beatty
(74) *Attorney, Agent, or Firm* — Jones Day

(57) ABSTRACT

The present disclosure refers to a retainer assembly adapted to be installed between a base assembly of an exterior rear view device and a vehicle to which the exterior rear view device is mounted, the retainer assembly, comprising a retainer means adapted to be mounted on one side to a door attachment portion of a base frame of the base assembly and on the opposite side to a door panel of the vehicle, wherein the retainer means is provided with at least one opening for allowing at least one datum structural element of the door attachment portion of the base frame to pass thereto, and at least one guiding projection and/or at least one guiding channel portion for providing at least part of a guiding channel for routing and/or guiding at least one harness from the vehicle to an electric component of the rear view device, and/or at least one sealing portion for covering at least a portion of the at least one harness. It also refers to a exterior (Continued)

rear view device with such a retainer assembly, a method for assembling such a rear view device and a vehicle with such a rear view device.

35 Claims, 7 Drawing Sheets

(51) Int. Cl.
  *B60R 1/12* (2006.01)
  *B60R 11/04* (2006.01)
(52) U.S. Cl.
  CPC ... *B60R 2001/1253* (2013.01); *B60R 2300/10* (2013.01); *B60R 2300/8046* (2013.01)
(58) Field of Classification Search
  CPC ........ B60R 2300/10; B60R 2300/8046; B60R 1/06; B60R 2011/004
  See application file for complete search history.

(56) References Cited

U.S. PATENT DOCUMENTS

| | | | |
|---|---|---|---|
| 8,690,363 B2 | 4/2014 | Hamada et al. | |
| 9,340,158 B2 | 5/2016 | Nishimura et al. | |
| 9,669,762 B2 * | 6/2017 | Pearson | B60R 1/06 |
| 11,370,359 B2 | 6/2022 | Lettis et al. | |
| 12,370,948 B2 * | 7/2025 | Matsubara | B60R 13/07 |
| 2002/0048100 A1 * | 4/2002 | Hoek | B60R 1/076 |
| | | | 248/479 |
| 2004/0057139 A1 | 3/2004 | Shinohara | |
| 2005/0248863 A1 | 11/2005 | Kawanishi | |
| 2007/0035865 A1 | 2/2007 | Ohashi | |
| 2012/0235009 A1 | 9/2012 | Horie et al. | |
| 2013/0070353 A1 | 3/2013 | Suzuki | |
| 2015/0138658 A1 | 5/2015 | Nishimura et al. | |
| 2020/0298762 A1 | 9/2020 | Ichimura et al. | |
| 2022/0305993 A1 | 9/2022 | Scott-Collins et al. | |
| 2022/0305995 A1 | 9/2022 | Scott-Collins et al. | |

* cited by examiner

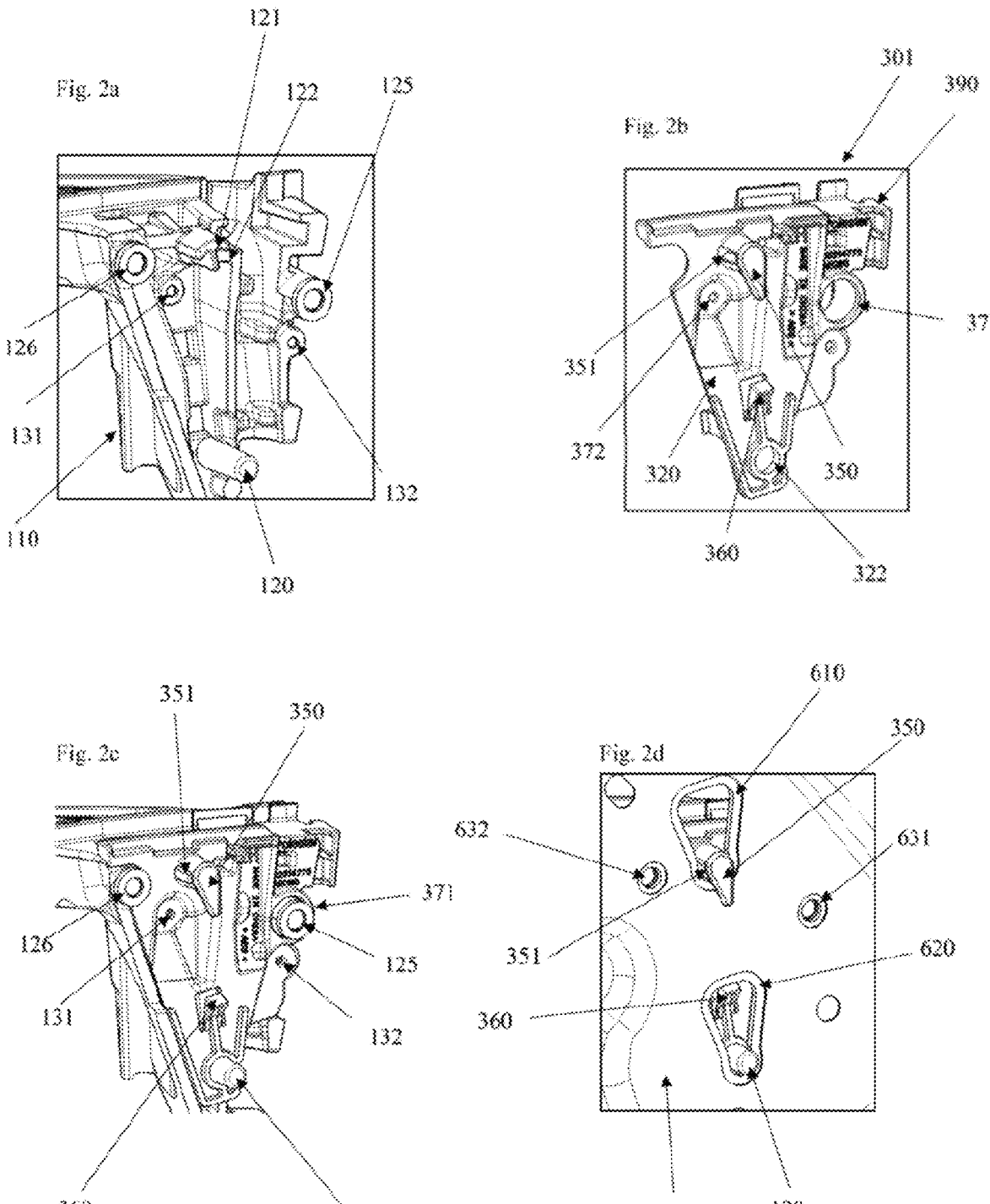

Fig. 3a
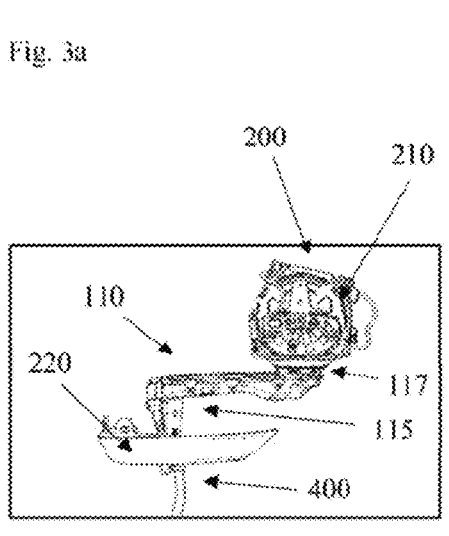
Fig. 4a
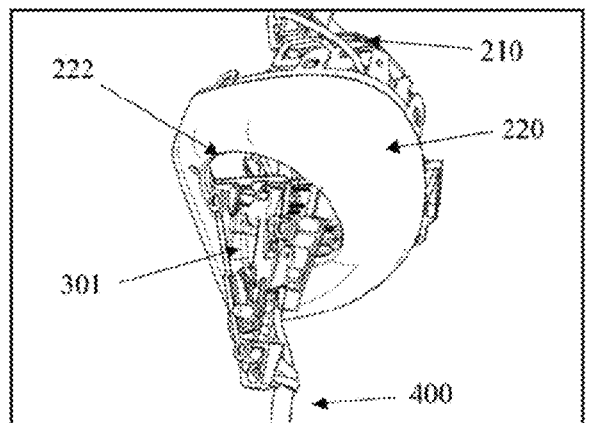
Fig. 3b
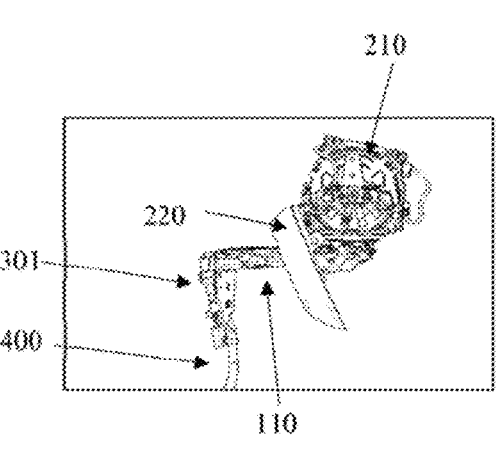
Fig. 4b
Fig. 3c
Fig. 4c
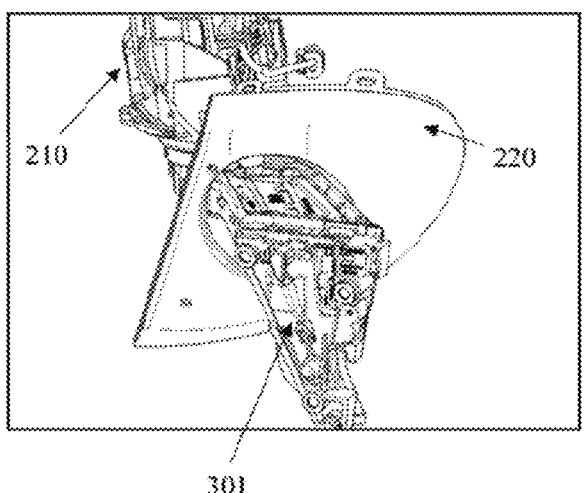

Fig. 5a
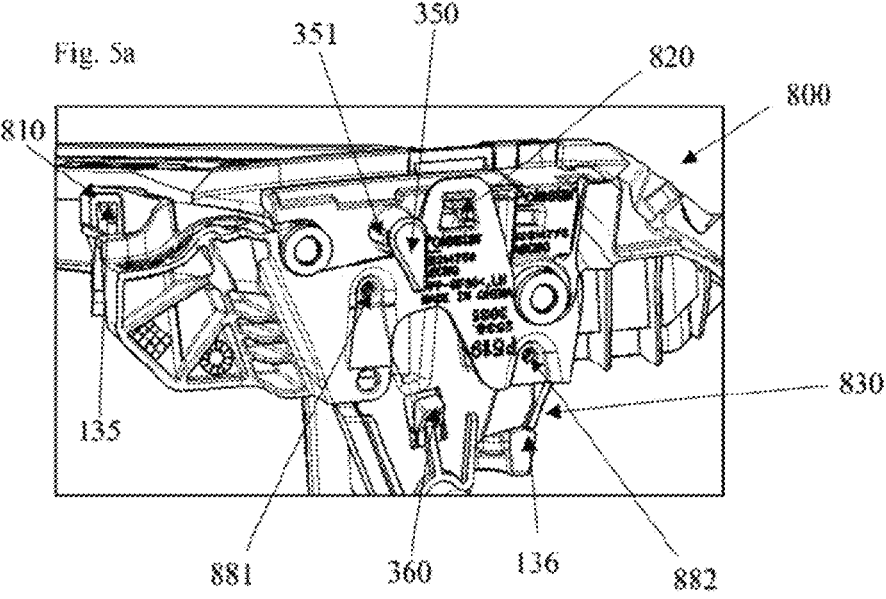
Fig. 5b
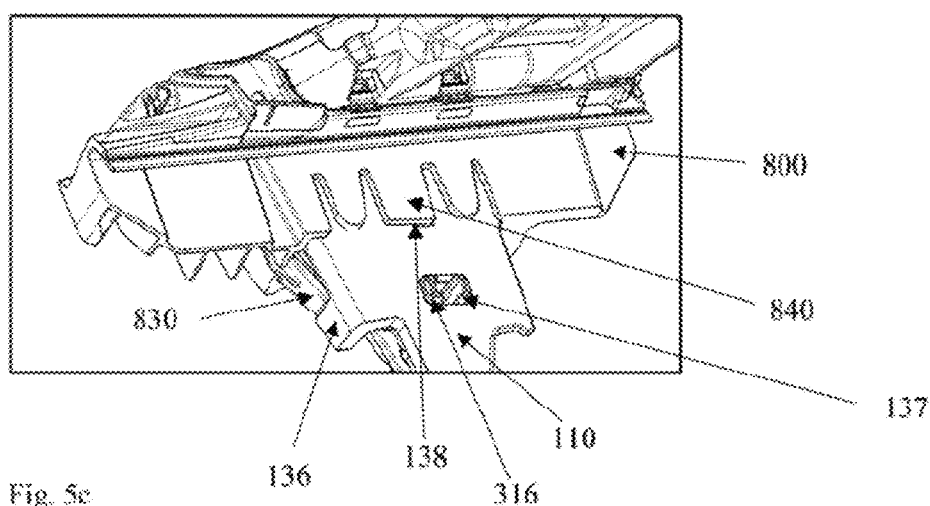
Fig. 5c

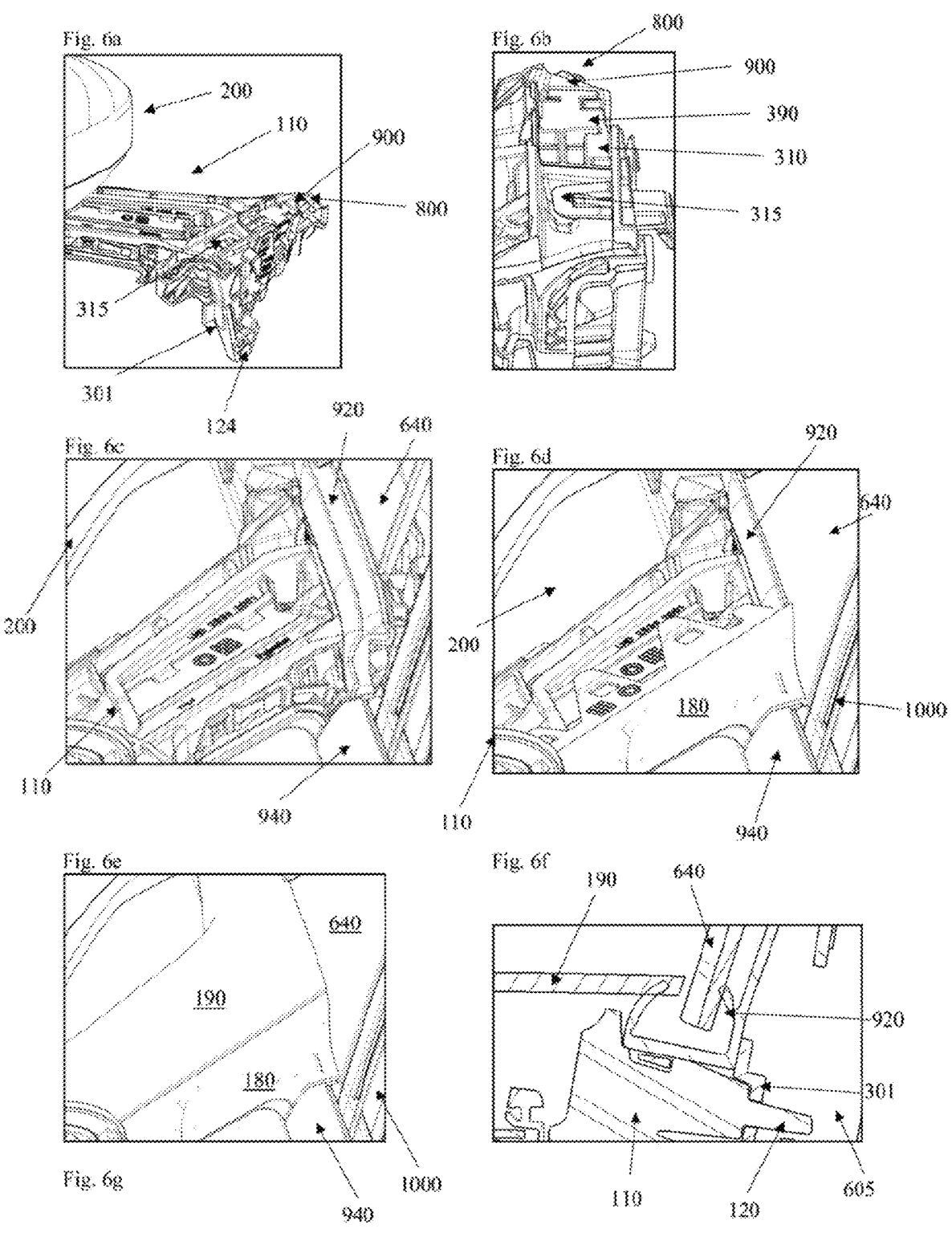

MULTI-FUNCTIONAL RETAINER MEANS, REAR VIEW DEVICE ASSEMBLY METHOD AND VEHICLE

CROSS-REFERENCE TO RELATED APPLICATIONS

This application is a continuation of U.S. patent application Ser. No. 17/689,519, filed on Mar. 8, 2022, which claims the benefit of priority to German Patent Application No. DE 10 2021 107 589.0, filed on Mar. 25, 2021, each of which are incorporated herein by reference in their entirety for all purposes.

BACKGROUND

1. Field

The present disclosure refers to a retainer assembly adapted to be installed between a base assembly of a rear view device and a vehicle, to a rear view device with a head assembly, a base assembly comprising such a retainer assembly, to a method for assembling such a rear view device and attaching the same to a vehicle and to a vehicle with such a rear view device.

2. Related Art

A rear view device typically includes a base assembly to be attached to a vehicle and a head assembly to be moveable relative to the base assembly. Generally the head assembly of a rear view device can be rotated between a driving position and a parking position.

The term "rear view" may refer to a view of the surrounding area, which is not in the field of view of a driver of a vehicle, i.e. the directions opposing, left, right, below and above of the viewing direction, but can also comprise the view in the direction of the viewing direction of the driver and/or any combinations of the directions. The rear view can be achieved via at least one rear view element in form of a reflective element like a mirror and/or an image acquisition means like a camera. The rear view, that is the field of view of the driver, can be adjusted by moving, in particular rotating, the reflective element and/or the image acquisition means. This in turn can be realized by moving the complete head assembly together with the reflective element and/or the image acquisition means such that the head assembly of the rear view device can be rotated also between a plurality of viewing position.

For moving the head assembly, the reflective element and/or the image acquisition means an actuator assembly is comprised by the rear view device, which can be controlled by a first control unit within the vehicle. Also the image acquisition means can be controlled via a second control unit, wherein both control units may be formed together. However, for the purpose of controlling data have to be transferred between the rear view device and the control unit within the vehicle requiring a harness.

For facilitating moving the head assembly together with the reflective element and/or the image acquisition means specific pivot joint systems have been developed, see WO 2018/215599 A1, as well as specific actuator assemblies, see WO 2019/002627 A1.

The structure of the base assembly of an exterior rear view device is important as it provides means for connecting the device to a vehicle. US 2020/0001791 A1 refers to a base assembly of an exterior rear view device, comprising a base frame; and a base cover housing the base frame and formed in at least two parts connected to each other, wherein the base assembly comprises a first opening at a first end of the base assembly at which the base frame is configured to be attached to a vehicle and a second opening at a second end of the base assembly at which a head assembly of the exterior rear view device is configured to be attached to the base frame, wherein at least one of a first sealing means at the first opening is provided comprising a two-component gasket with a hard component and a soft component, the hard component comprising: at least one first connection element configured to engage at least one first connection element of a first cover part; and at least one first connection element of a second cover part configured to provide a locking connection between the first cover part and the second cover part, and/or a second sealing means at the second opening is comprising a two-component gasket with a hard component and a soft component, the hard component comprising: at least one second connection element configured to engage at least one second connection element of the first cover part; and at least one second connection element of the second cover part to provide a locking connection between the first cover part and the second cover part.

The base frame fulfills a multitude of functions, in particular that of supporting the head assembly and connecting the same as well as electronic components of the exterior rear view device to the vehicle and a central control unit within the vehicle, the latter requiring a harness to be safely guided and sealed, electrically as well as with respect to moisture. As the base frame is made of metal, often aluminum, fulfilling said functions is a challenge.

SUMMARY

An example object of the present disclosure is to provide a retainer assembly suited to be installed between a base assembly of a rear view device and a vehicle, assisting in fulfilling the tasks of guiding and sealing a harness on its path from the interior of the vehicle into the exterior rear view device attached to the vehicle.

This object may be achieved according to a first aspect by a retainer assembly adapted to be installed between a base assembly of an exterior rear view device and a vehicle to which the exterior rear view device is mounted, the retainer assembly comprising a retainer means adapted to be mounted on one side to a door attachment portion of a base frame of the base assembly and on the opposite side to a door panel of the vehicle, wherein the retainer means is provided with at least one opening for allowing at least one datum structural element of the door attachment portion of the base frame to pass thereto, and at least one guiding projection and/or at least one guiding channel portion for providing at least part of a guiding channel for routing and/or guiding at least one harness from the vehicle to an electric component of the rear view device, and/or at least one sealing portion for covering at least a portion of the at least one harness.

According to one embodiment the at least one opening is provided by a holding portion, with preferably a first opening allowing a location pin of the door attachment portion to pass thereto, and/or at least one second opening allowing a T shaped location projection of the door attachment portion to pass thereto.

According to another embodiment at least one first hook and/or first clip is provided by the holding portion for attachment to the door panel, and/or at least one second hook and/or second clip is provided by the holding portion for attachment to the door attachment portion, with preferably the first and second hook(s) and/or clips(s) extending in opposite directions.

It is proposed that the first hook is adapted to hold the rear view device in Y direction to assist an assembly thereof to the door panel, preferably via screws, and/or the first clip determines the final assembly Z position of the rear view device, and/or the first clip is arranged next to the first opening, and/or the first hook provides the at least one second opening, and/or there are at least two second clips.

The retainer means may be provided with at least one datum area and/or with at least one T shaped location projection within a datum area for a base cover. The retainer means may form a single component, preferably from plastic.

The disclosure also proposes that the retainer assembly further comprises a sealing means adapted to be mounted on the retainer means, preferably by being attached to the retainer means via at least one snap and/or chip connection and/or to the door attachment portion, in particular via at least one screw, clips and/or snap connection. The sealing means may be in form of a 2K door gasket and/or may be provided with at least one datum area for a base cover.

The present disclosure provides according to a second aspect an exterior rear view device with a base assembly for attachment to a vehicle, a head assembly with at least one reflective element and/or image acquisition means, with the head assembly being moveable relative to the base assembly, and a retainer assembly according to the present disclosure, wherein the sub-assembly of the base frame, the sealing means and the retainer means forms a channel for positioning a glass run seal, in particular allocated to a cheater panel.

According to one embodiment the base frame is provided at a first end with the door attachment portion and at a second end with a head attachment portion, with the major portion between theses ends being provided in form of an arm, wherein preferably the door attachment portion extends substantially perpendicularly to the arm.

It is also proposed that the door attachment portion is provided with an opening for a harness holder, wherein preferably the harness holder is provided with a fixing tie for holding the harness and a cli for engaging said opening such that the harness is firmly located to the base frame in all directions.

Further, it is proposed that a camera harness is comprised by the harness, with the camera harness preferably splitting off the harness adapted for routing and/or between the harness holder and the retainer means. The at least one guiding projection and/or guiding channel is guiding the camera harness, and/or the sealing portion is covering the camera harness, in particular in a bending region between the door attachment portion and the arm of the base frame.

The disclosure also describes that the electric component comprises at least one camera, wherein preferably the camera is arranged in the base assembly.

According to another embodiment the base cover comprises a base cover cap and an upper base cover, wherein preferably the base cover cap and an upper base cover are attached via snap and/or clip connections, and/or the head assembly comprises a lower case with an opening dimensioned such that the base frame with its arm and door attachment portion together with the retainer means can pass.

Still further, the present disclosure provides according to a third aspect a method for assembling the rear view device of the present disclosure comprising the following steps: clamping the retaining means on the door attachment portion of the base frame, guiding the door attachment portion with the attached retaining means through the opening of the lower case of the head assembly, and clamping the sealing means onto the door attachment portion and/or the retaining means, which preferably the sealing means and the retaining means being screwed onto the door attachment portion.

The following steps may also be comprised: attaching the harness to the door attachment portion via the harness holder, preferably prior to the clamping of the retaining means on the door attachment portion of the base frame.

Still further, the following steps may be comprised: passing the hook of the door attachment portion through a first opening in the door panel to obtain a hang connection, entering screws into the screw openings of the door panel and into the screw openings of the door attachment portion, and passing the positioning pin of the door attachment portion through a second opening in the door panel and clamping the clip of the retainer means to the door panel by passing through said second opening.

Also the following steps may be comprised: the T shaped location projection of the door attachment portion engages the door panel by passing with its arms through openings provided by the hook, and/or the clip is arranged between the positioning pin and the hook, and/or the clip and the positioning pin engage opposite regions of the second opening of the door panel.

With the present disclosure it is also proposed that the sub-assembly of the base frame, the sealing means and the retainer means forms a channel, and the cheater panel pushes the glass run seal at least partly into the channel.

It is also proposed that the base cover cap and the upper base cover are assembled by rotating into clip connecting, and/or the gap between the base cover cap and the upper base cover on the one side and the door on the other side is sealed by the glass run seal being pushed against and/or into the channel as well as the cheater panel during the assembling the base cover cap and the upper base cover.

The present disclosure also provides according to a fourth aspect a vehicle with at least one rear view device of the present disclosure, in particular assembled according to a method of the present disclosure such that the base assembly merges out of the glass run seal and/or a door waist finisher.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 1*c* is a cross-section of the retainer means and the base frame of FIG. 1*b;*

FIG. 1d is a perspective view of the lower end of the base frame in FIG. 1a from the opposite side compared to FIG. 1a;

FIG. 1e is a perspective view of the lower end of the base frame in FIG. 1a from the same side as FIG. 1a;

FIG. 2a is a perspective view of a part of the base frame of FIG. 1a;

FIG. 2b is a perspective view of the retainer means of FIG. 1a;

FIG. 2c is a perspective view of retainer means attached to the base frame of FIG. 1b;

FIG. 2d is a perspective view on the retainer means and the base frame attached to the vehicle, from the side of a door panel;

FIGS. 3a-3g are perspective views demonstrating the assembly of the base frame and the retainer means of FIG. 1 with a lower case of a head assembly and a sealing means of the retainer assembly;

FIGS. 4a-4e are other perspective views of the assembly stages shown in FIGS. 3a to 3e;

FIGS. 5a-5c are perspective views demonstrating attachment features of the sealing means of FIG. 3g;

FIGS. 6a-6f are perspective views demonstrating the assembly of a glass run seal, a cheater panel, a base cap, a base cover upper with respect to the door panel and a window.

DETAILED DESCRIPTION

Figures 1A, 1B:
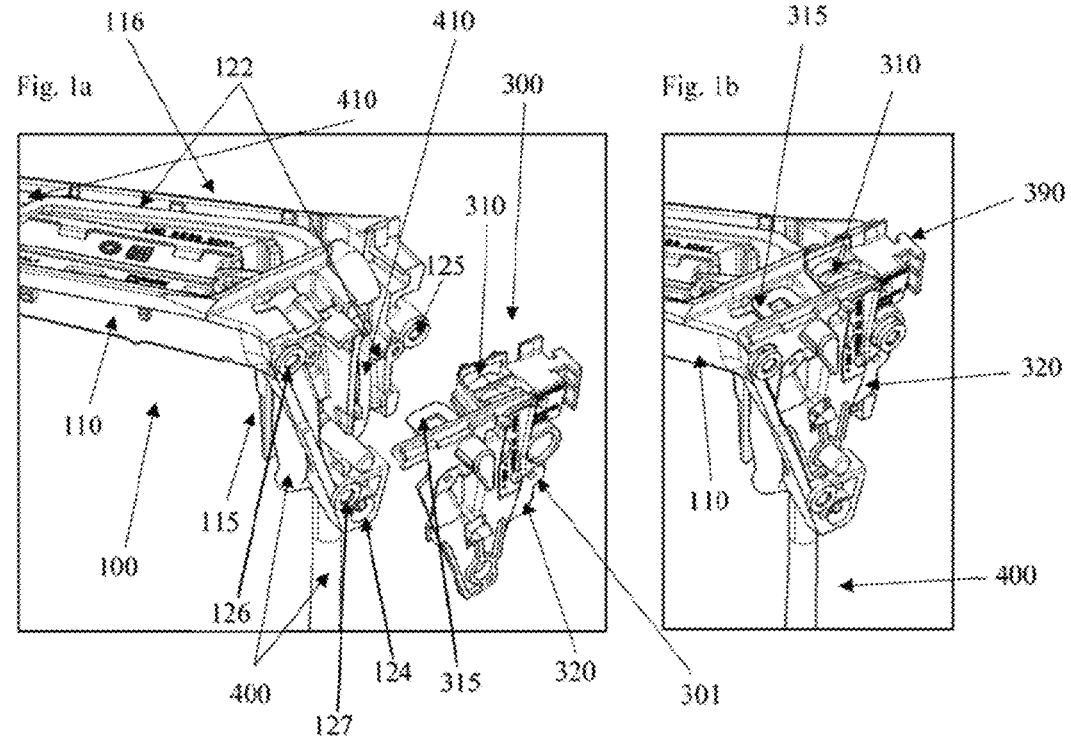
FIG. 1*a* is a perspective view of a part of a base frame of a base assembly of an exterior rear view device as well as a retainer means of a retainer assembly to be interposed between the base assembly and a vehicle (not shown)
FIG. 1*b* is a perspective view of the retainer means of FIG. 1*a* attached to the base frame of FIG. 1*a;*

FIGS. 1a to 2d show a retainer means 301 of a retainer assembly 300 to be arranged between a base frame 110 of a base assembly 100 of an exterior rear view device 1 and a door panel 605 of a door 600 of a vehicle 2. The retainer means 301 may be manufactured from a plastic material, whereas the base frame 110 is metallic and may be manufactured from aluminum.

Figures 1C, 1D, 1E:
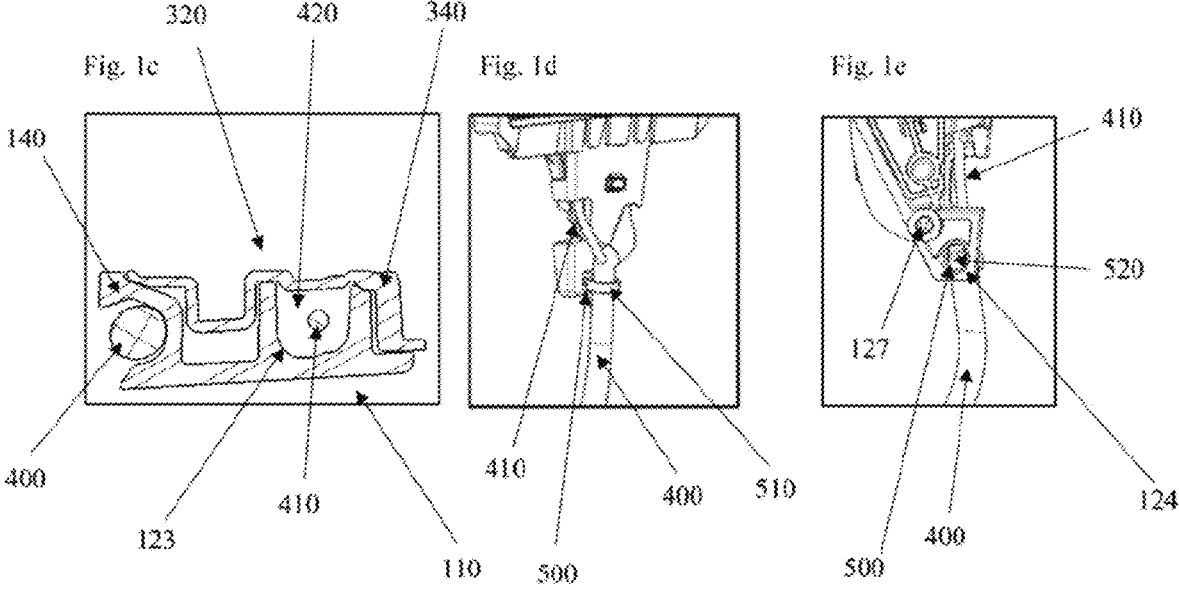

The FIGS. 1a to 1c also show a harness 400 for electrically connecting in particular a power source and a control unit within the vehicle (not shown) with electric components of the exterior rear view device. Such electric components may comprise, as e.g. shown in FIGS. 3a to 3g, an actuator assembly 210 suitable for moving a head assembly 200 together with a reflective element (not shown) relative to the base frame 110 supporting the head assembly 200, and a camera 700 as well as an indicator means like a turn signal indicator 710 shown in FIG. 7. Said harness 400 may comprise a camera harness 410.

The retainer means 301 is a multi-function component. The different functions will be described with respect to the other components of the exterior rear view device 1 as well as the vehicle 2 in the following.

A function of the retainer means 301 is harness sealing, managing harness routing and accommodating variation in the camera harness 410 and cleaning systems (not shown), as described in the following:

The base frame 110 has a door attachment portion 115 at one end, with said door attachment portion 115 being provided with an opening 124 for a harness holder 500 at its lower, free end, as best seen in FIGS. 1d and 1e. Said harness holder 500 is formed with a fixing tie 510 for holding the harness 400 and a clip 520 for connecting the holder 500 to said door attachment portion 115 by passing through the opening 124.

The base frame harness locator opening feature governs harness position length the door side and the rear view device side, and provides a strong retention eliminating risk of the harness 400 being misplaced e.g. by being pulled through during handling. Further, the locating feature leads to reduced tolerance of fit-to-door. In other words, the harness 400 is firmly located to the base frame 110 in all directions allowing a solid datum strategy for harness lengths and provides the ability to hold as well as transport the exterior rear view device 1 whilst holding on to the harness 400.

The harness 400 as well as the camera harness 410 divided therefrom above the harness holder 500 extend between the door attachment portion 115 of the base frame 110 and a holding portion 320 of the retainer means 301 to an upper end of the door attachment portion 115, which turns into a main portion of the base frame 110 extending away from the door panel 605 towards the head assembly 200, being provided in form of an arm 116, with a head assembly attachment portion 117 of the base frame 110 being provided at the second end of the base frame 110 opposite the first end, see e.g. FIG. 3a.

The retainer means 301 is provided with a guiding projection 122 for guiding the camera harness 410 to a sealing portion 310 of the retainer means 301 extending substantially perpendicularly to the holding portion 320 to cover the camera harness 410 at its bending region at the transition between the door attachment portion 115 and the arm 116.

While the base frame 110 is provided with a harness guiding channel portion 140 for guiding the harness 400 and a camera harness guiding channel portion 123 for guiding the camera harness 410, the holding portion 320 of the retainer means 301 also provides a camera harness guiding channel portion 340 to substantially close a channel 420 for the camera harness 410, as shown in FIG. 1c.

As the retainer means 301 is not metallic, the sealing of the harness 400, together with the camera harness 410, as well as the attachment of the metallic base frame 110 to the door panel 605 becomes safer. The design of the retainer means 301 allows to accommodate different sets of harness and cleaning system for all variations of mirror trim level. Further, the retainer means 301 ensures an easy assembly to seal in particular the camera harness 410 after being mounted and to manage its routing along the base frame door attachment portion 115, without departing from the commonly used datum system between the base frame 110 and the door panel 605, further illustrated in the following:

The base frame 110 is provided with a location pin 120 as well as a T shaped location projection 121 belonging to the datum system ensuring a correct assembly of the components of the exterior rear view device 1 and a correct attachment of the exterior rear view device 1 to the vehicle 2. The location pin 120 and the T shaped location projection 121 extend substantially perpendicularly to the plane of the door panel 605, as can be best seen in FIGS. 2a and 2d. The retainer means 301 is provided with an opening 322 for the location pin 120 and a hook 350 with openings 351 for the arms of T shaped location projection 121, as can be best seen in FIG. 2b. FIG. 2d illustrates that the location pin 120 as well as the T shaped location projection 121 pass through the respective openings 322, 351 of the retainer means 301 to also pass respective openings 610, 620 within the door panel 605 to engage the same, with the hook 350 of the retainer means 301 ensuring the respective engagement.

The base frame T shaped location projection 121 and the location pin 120 provide the primary and secondary datum strategy to the door datum system in X+Z directions, while the Y direction is controlled using three screw bosses. The door panel 605 in FIG. 2d shows two screw openings 631 and 632 aligned to two screw openings 131 and 132 of the base frame 110, respectively, which in turn pass openings 371 and 372 of the retainer means 301.

Thus, the corresponding locating features of the base frame 110 and the retainer means 301 allow base frame datum features to interface with the door 600 minimizing tolerance of datum strategy.

Further location projections 125, 126 and 127 are provided by the door attachment portion 115.

The retainer means 301 along with the location pin 120 and the T shaped location projection 121 not only provides an accurate assembly to the door panel datum system, but also facilitates the assembly as it provides a robust 3rd hand clip/hanger function, as further illustrated in the following:

The retainer means 301 provides attachment features to support assembly to the base frame 110 as well as the door, by being formed with the hook 350 and clips 315, 316, 360. Two clips 315 and 316 serve the attachment to the base frame 110 as best seen in FIGS. 1a, 1b and 5b. The hook 350 primarily serves to hold the exterior rear view device 1 in Y direction to assist assembly of the screws (not shown), while the third clip 360 is on secondary location keyway to highlight when the exterior rear view device 1 is in its final assembly Z position, as best seen in FIG. 2d.

The retainer assembly 300 comprises, in addition to the retainer means 301, a sealing means 800 in form of a 2K door gasket. Before describing the structure and function of the sealing means 301 in detail, in the following further assembly steps via simple clip connections are described with reference to FIGS. 3a to 5c:

The slim design of the base frame 110 allows a case lower or lower case 220 of the head assembly 200 to be assembled over the door attachment portion 115 and the arm 116 of the base frame 110 to reach the region of the head assembly 200, as shown in FIGS. 3a to 3f together with FIGS. 4a to 4f. In this respect it is to be noted that it is critical to assemble high gloss components like the lower case 220 late in the assembly sequence to minimize risk of damage. For that purpose the lower case 220 is provided with an opening 222, preferably being substantially circular, through which the base frame 110 together with the retainer means 301 can pass.

Figures 3D, 3E, 3F, 3G, 4D, 4E:
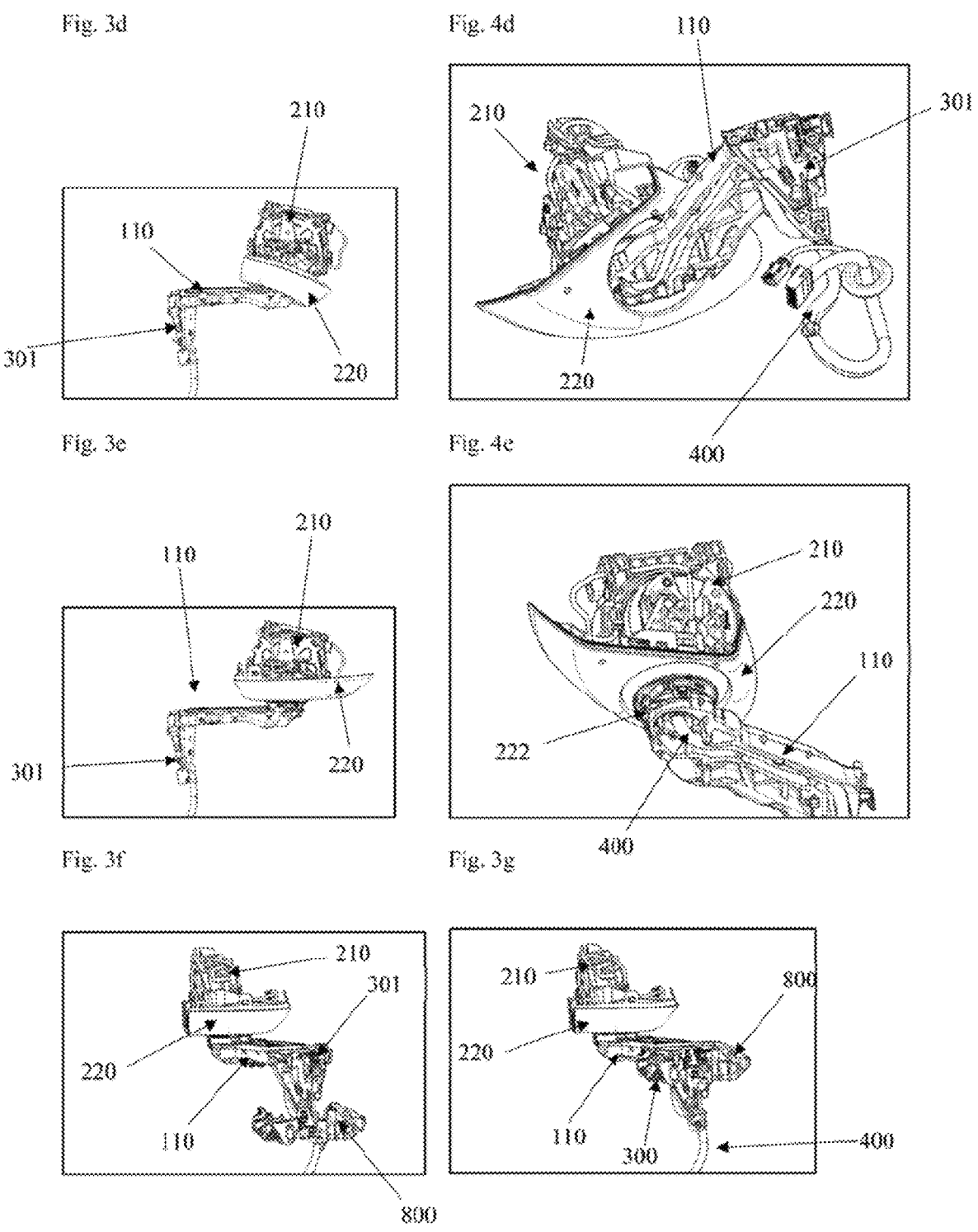

The sealing means 800 is mounted after the lower case 220, as shown in FIGS. 3f and 3g. The sealing means location strategy is critical as it dictates the datum strategy for the corresponding base cover components discussed with respect to FIGS. 6a to 6g below.

Thus, the smaller base frame geometry and the provision of a separate 2K door gasket provided by the sealing means 800 permit the lower case 220 to be assembled over the base frame 110, and a T section support structure for the base cover permits a simple clip together assembly.

In to following the attachment of the sealing means 800 is described with reference to FIGS. 5a to 5c:

Four clips 810, 820, 830 and 840 allow to attach the sealing means 800 to the base frame 110, with the base frame 110 comprising complementary steps 135 and 136 as well as openings 137 and 138.

The two screw positions determined by the openings 881, 882 allow to secure the sealing means 800 and retainer means 301 to the base frame 110. These are package protections only if more strength is required.

A datum area 850 for a base cover and a T-slot built into both the retainer means 301 and the sealing means 800, see the T shaped location projection 390 and the T-slots 391, 851 serve to maximize and gain strength from the base frame 110 into the area for base cover assembly.

Figure 7:
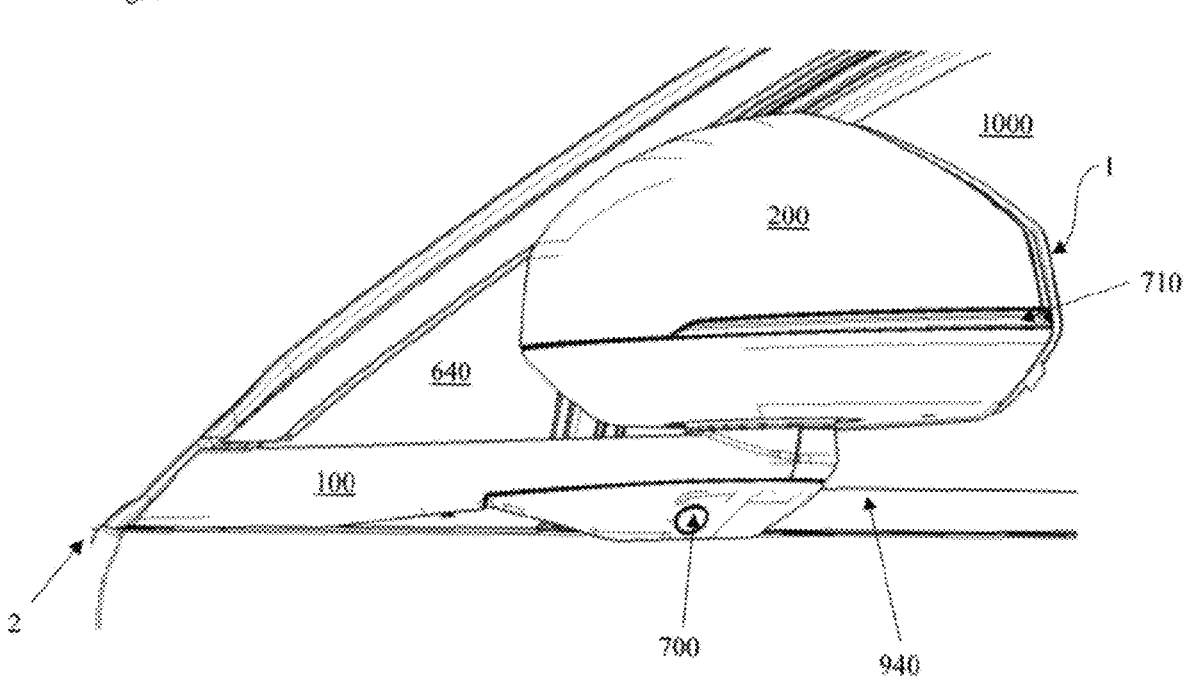
FIG. 7 is a perspective view of an exterior rear view device of the present disclosure with a retaining assembly of the present disclosure and attached to a vehicle door.

The sub-assembly of the base frame 110, the retainer means 301 and the sealing means 800 forms a channel 900, see FIGS. 6a and 6b, for positioning/locating a glass run seal 920 in particular allocated to a cheater panel 640 as shown e.g. in FIG. 6c. In the following the attachment of a base cover cap 150 and a base cover upper or upper base cover 180 are described with reference to FIGS. 6c to 6f:

The combination the base frame 110, the retainer means 301 and the sealing means 800 forms the channel 900 which locates the glass run seal 920 on to the exterior rear view device 1. The glass run seal 920 runs along the cheater panel 640 and is an extension of the glass run seal running along the window 1000 and being covered by a door trim 940 as shown in FIGS. 6d and 7.

The base cover cap 180 clips to the base frame 110, see FIG. 6d, and also the upper base cover 190 is attached by clip connection, see FIG. 6e. The clip connection may be located behind a chrome wait finisher (not shown).

The cheater panel 640 pushes the glass run seal 920 into the correct position inside the channel 900 while being assembled. The base cover cap 180 and the upper base cover 190 assemble in such a way that when rotating into their position a sealing lip of the glass run seal 920 is pushed against the cheater panel 640 sealing the gap between the base cover cap 180 and the upper base cover 190 on the one side and the cheater panel 640 on the other side, see FIG. 6f.

Thus, the exterior rear view device 1 holds the glass run seal 920 in a solid position as shown in FIG. 6f. This provides a very pleasing overall appearance suggesting that the exterior rear view device 1 extends or rather grows out of a wait finisher 940 covering a part of the glass run seal 920, see FIG. 7.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

1 exterior rear view device
2 vehicle
100 base assembly
110 base frame
115 door attachment portion
116 arm
117 head attachment portion
120 location pin
121 T shaped location projection
123 camera harness guiding channel portion
124 opening for harness holder 125 location projection
126 location projection
127 location projection
131 screw opening
132 screw opening
135 step for sealing means clip
136 step for sealing means clip
137 opening for sealing means clip
138 opening for sealing means clip
140 harness guiding channel portion
180 base cover cap
190 upper base cover
200 head assembly
210 actuator assembly
220 lower case
222 opening of lower case
300 retainer assembly
301 retainer means
310 sealing portion
315 clips
316 clip
320 holding portion
322 opening for location pin
340 camera harness guiding channel portion
350 hook
351 opening for arm of T shaped location projection
360 clip
371 opening
372 opening
380 opening for sealing means clip
390 T shaped location projection
391 T-slot
400 harness
410 camera harness
420 guiding channel
500 harness holder
510 fixing tie
520 clip
605 door panel
610 opening for hook
620 opening for location pin
631 screw opening
632 screw opening
640 cheater panel
700 camera
710 turn signal indicator
800 sealing means in form of 2K door gasket
810 clips
820 clips
830 clips
840 clips
850 datum area for upper case
851 T-slot
881 screw opening
882 screw opening
900 channel
920 glass run seal
940 door trim
1000 window It is claimed:

1. A method for assembling an exterior rear view device with a base assembly for attachment to a vehicle, comprising:

clamping a retaining means on a door attachment portion of a base frame of the base assembly, wherein the retainer means is configured to be mounted on one side to the door attachment portion of the base frame and on an opposite side to a door panel of the vehicle, and wherein the retaining means includes at least one opening for allowing at least one datum structural element of the door attachment portion of the base frame to pass thereto, and at least one sealing means for covering at least a portion of at least one harness from the vehicle to an electric component of the rear view device;

guiding the door attachment portion with the attached retaining means through an opening of a lower case of a head assembly of the exterior rear view device; and clamping the sealing means onto the door attachment portion and/or the retaining means.

2. The method of claim 1, wherein the sealing means and the retaining means are screwed together onto the door attachment portion.

3. The method of claim 1, wherein the retaining means includes at least one guiding projection and/or at least one guiding channel portion for providing at least part of a guiding channel for routing and/or guiding the at least one harness from the vehicle to an electric component of the rear view device.

4. The method of claim 1, wherein a sub-assembly of the base frame, the sealing means and the retaining means form a channel for positioning a glass run seal allocated to a cheater panel.

5. The method of claim 4, wherein the cheater panel pushes the glass run seal at least partly into the channel.

6. The method of claim 4, further comprising:

sealing a gap between the base cover cap and the upper base cover on one side and the door on another side by pushing against a glass run seal or the channel as well as the cheater panel while assembling a base cover cap and an upper base cover.

7. The method of claim 1, further comprising:

providing the at least one opening of the retaining means by a holding portion of the retainer means.

8. The method of claim 7, wherein the holding portion includes a first opening allowing a location pin of the door attachment portion to pass therethrough.

9. The method of claim 7, wherein the holding portion includes at least one second opening allowing a T shaped location projection of the door attachment portion to pass therethrough.

10. The method of claim 7, further comprising:

providing at least one first hook and/or first clip by the holding portion for attachment to the door panel.

11. The method of claim 10, further comprising:

providing at least one second hook and/or second clip by the holding portion for attachment to the door attachment portion.

12. The method of claim 10, wherein the first and second hook and/or clips extend in opposite directions.

13. The method of claim 12, further comprising:

adapting the first hook to hold the rear view device in a Y direction to assist an assembly thereof to the door panel; and/or determining a final assembly Z position of the rear view device by the first clip; and/or arranging the first clip next to the first opening; and/or providing the at least one second opening by the first hook; and/or providing at least two second clips.

14. The method of claim 1, wherein the retainer means includes at least one datum area and/or at least one T shaped location projection within a datum area for a base cover.

15. The method of claim 1, further comprising:

attaching the sealing means to the retainer means via at least one snap and/or clip connection and/or to the door attachment portion via at least one screw, clip and/or snap connection.

16. The method of claim 15, wherein the sealing means is provided with at least one datum area for a base cover.

17. The method of claim 1, wherein the retaining means is formed as a single component.

18. The method of claim 17, wherein the retaining means is plastic.

19. The method of claim 1, wherein the retaining means is in form of a 2K door gasket.

20. The method of claim 1, wherein the base frame includes the door attachment portion at a first end and a head attachment portion at a second end, and wherein a portion between the first and second ends forms an arm.

21. The method of claim 20, wherein the door attachment portion extends substantially perpendicular to the arm.

22. The method of claim 1, wherein the door attachment portion includes an opening for a harness holder.

23. The method of claim 22, wherein the harness holder includes a fixing tie for holding the harness and a clip for engaging said opening such that the harness is firmly located to the base frame in all directions.

24. The method of claim 23, wherein a camera harness is split off the harness between the harness holder and the retaining means.

25. The method of claim 23, further comprising:

routing and/or guiding the camera harness by at least one guiding projection and/or guiding channel.

26. The method of claim 23, further comprising: covering the camera harness by the sealing means in a bending region between the door attachment portion and an arm of the base frame.

27. The method of claim 1, further comprising:

arranging at least one camera in the base assembly.

28. The method of claim 1, further comprising:

attaching a base cover cap and an upper base cover.

29. The method of claim 28, wherein the base cover cap and the upper base cover are attached via snap and/or clip connections.

30. The method of claim 1, wherein the head assembly includes a lower case with an opening, with the opening being dimensioned such that the base frame with an arm and door attachment portion together with the retaining means can pass through the opening.

31. The method of claim 30, wherein the at least one harness is attached prior to clamping the retaining means on the door attachment portion of the base frame.

32. The method of claim 1, further comprising:

attaching the at least one harness to the door attachment portion via a harness holder.

33. The method of claim 1, further comprising:

passing a hook of the door attachment portion through a first opening in the door panel to obtain a hang connection;

entering screws into the screw openings of the door panel and into the screw openings of the sealing means; and passing a positioning pin of the door attachment portion through a second opening in the door panel and clamping a clip of the retainer means to the door panel by passing through said second opening.

34. The method of claim 33, wherein a T-shaped location projection of the door attachment portion engages the door panel by passing arms through openings provided by the hook, and/or the clip is arranged between the positioning pin and the hook, and/or the clip and the positioning pin engage opposite regions of the second opening of the door panel.

35. The method of claim 1, further comprising:

assembling a base cover cap and an upper base cover by rotating into clip connections.

* * * * *